July 8, 1924.
J. E. SCHUMACHER
1,500,206
STEAM, HYDRAULIC, AND OTHER FLUID PRESSURE ENGINE
Filed July 9, 1923   9 Sheets-Sheet 4
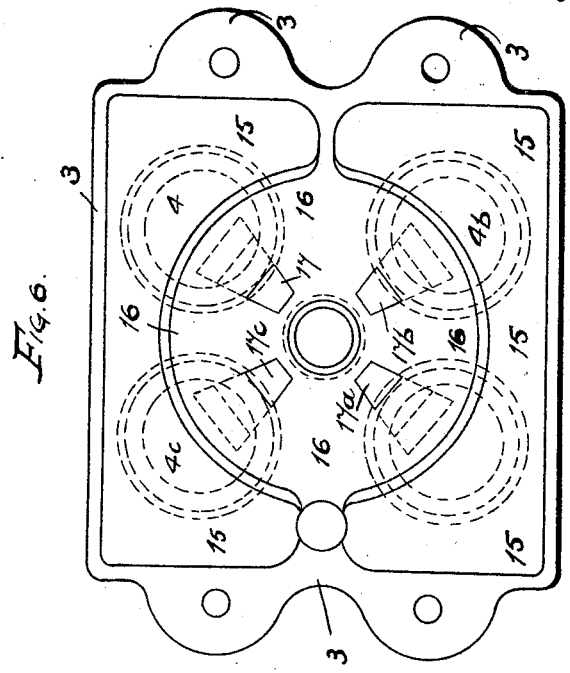
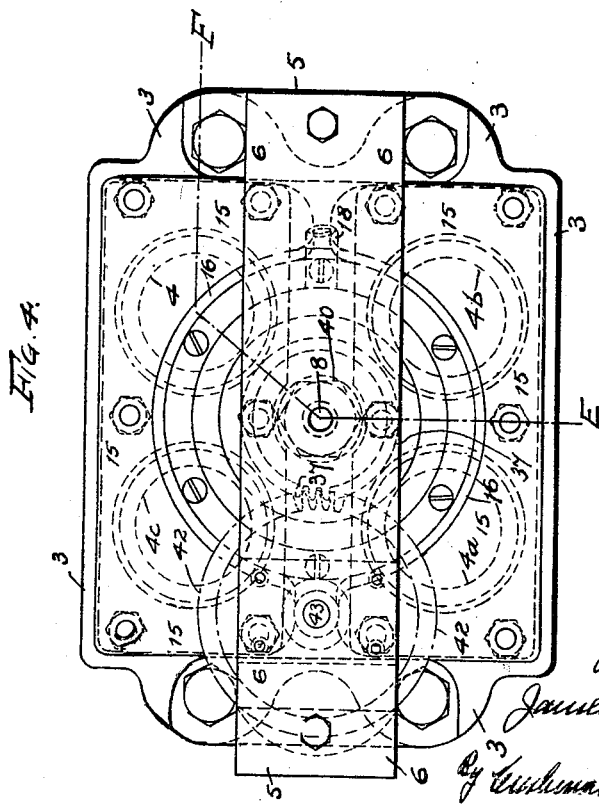

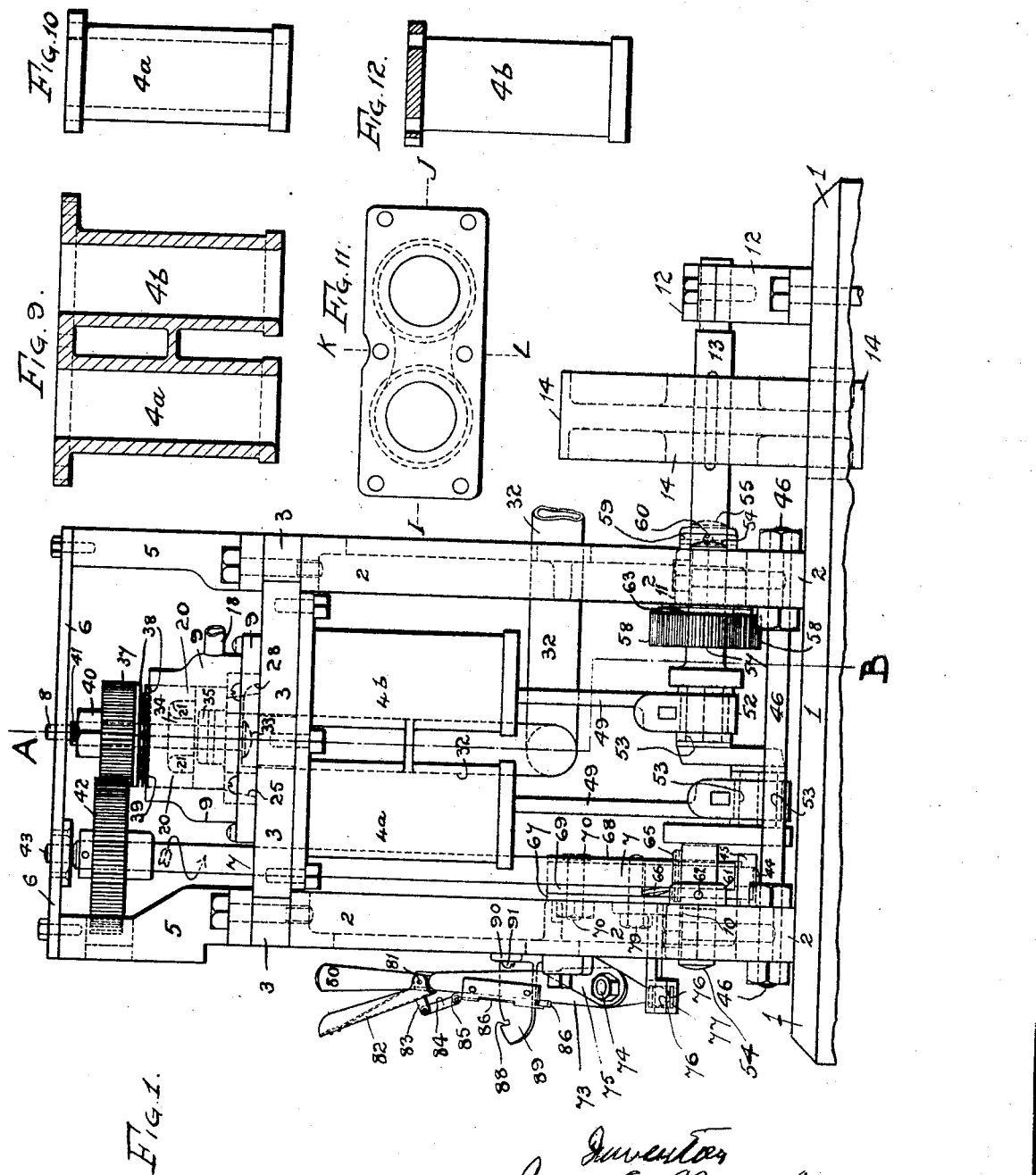

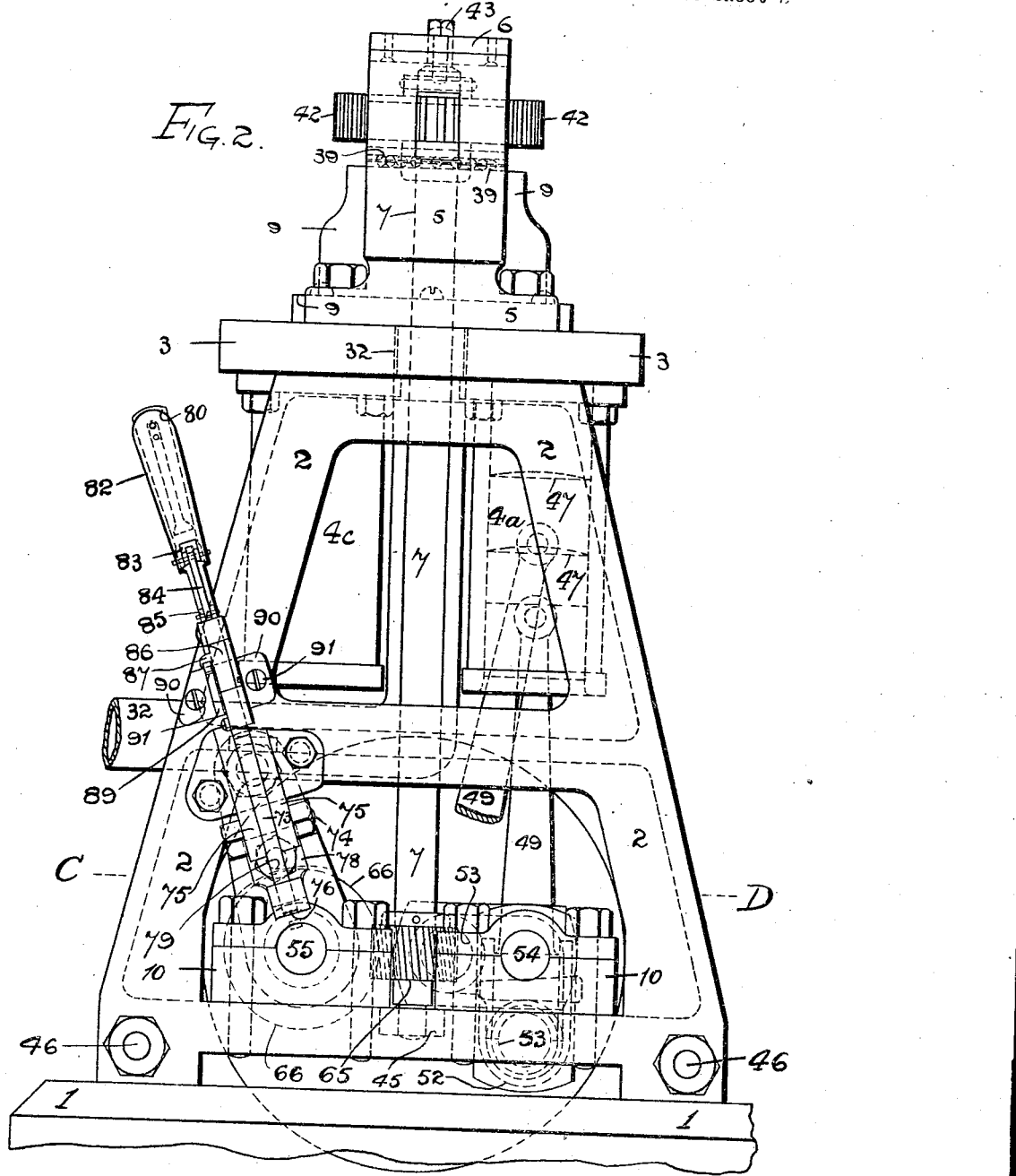

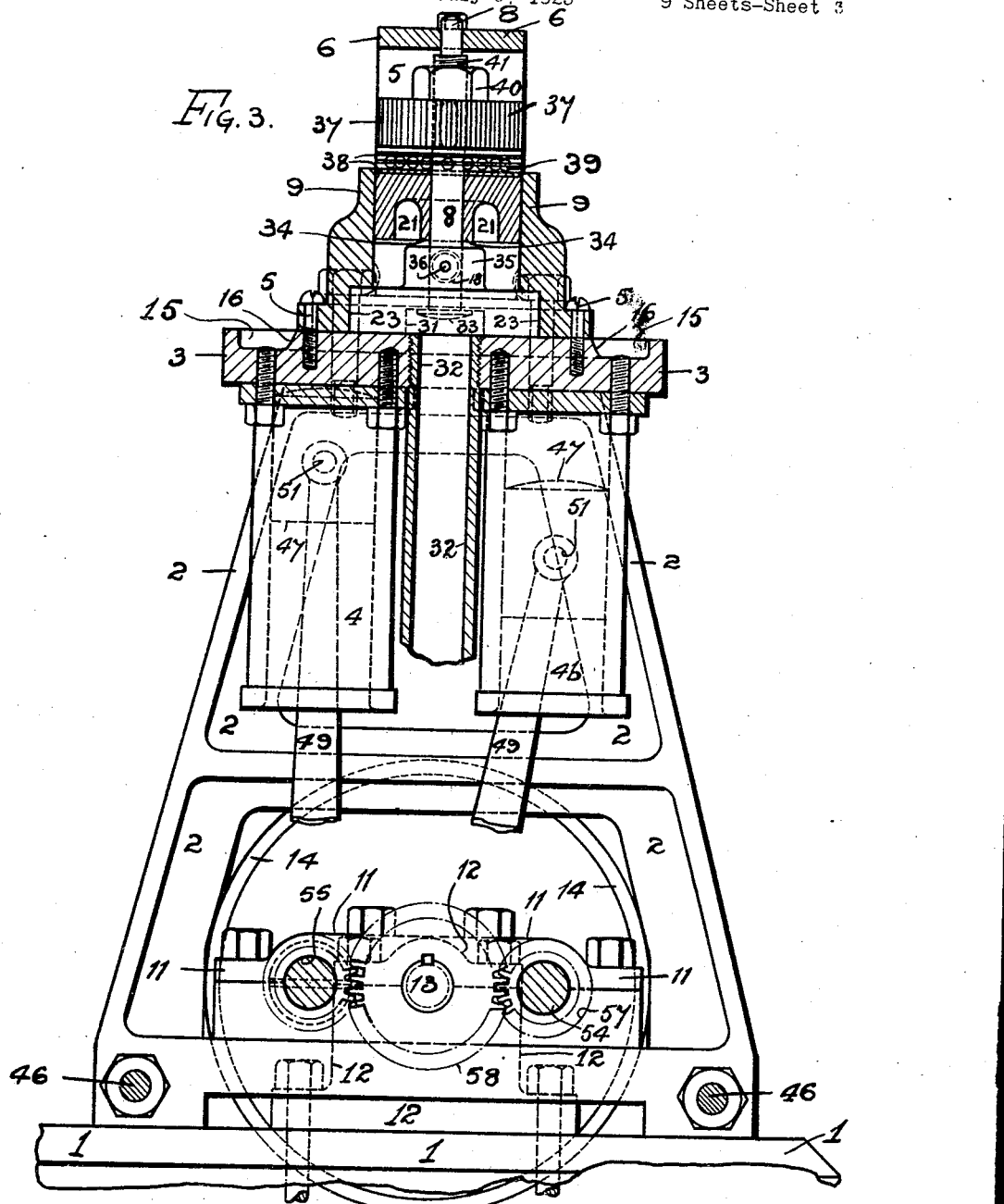

July 8, 1924.
J. E. SCHUMACHER
1,500,206
STEAM, HYDRAULIC, AND OTHER FLUID PRESSURE ENGINE
Filed July 9, 1923    9 Sheets-Sheet 6
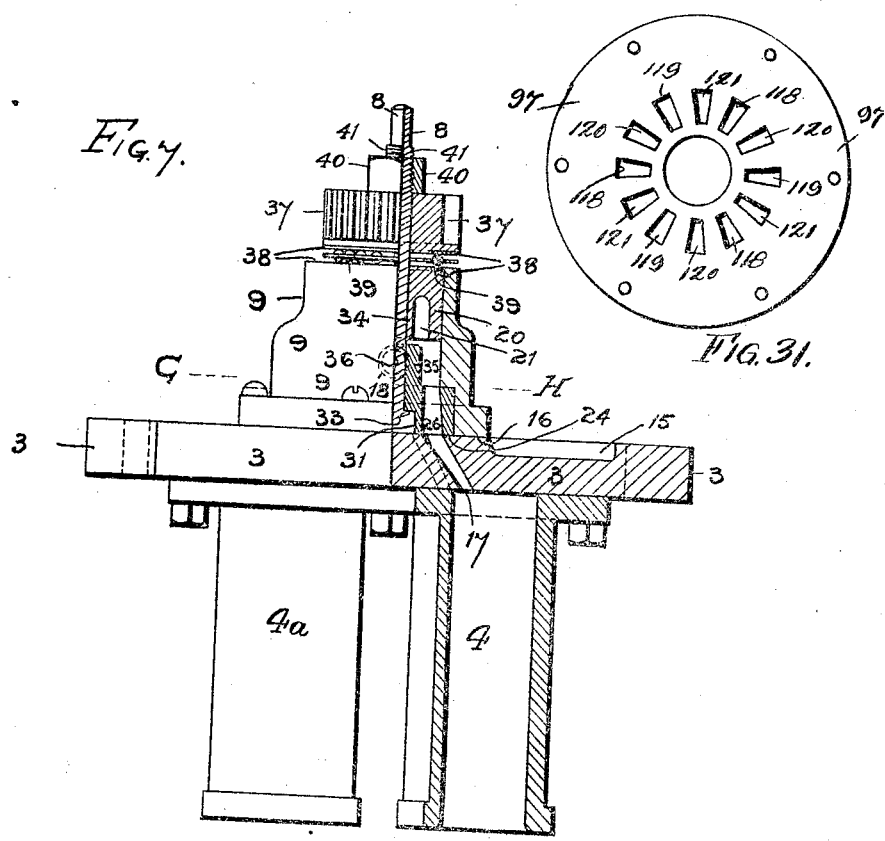
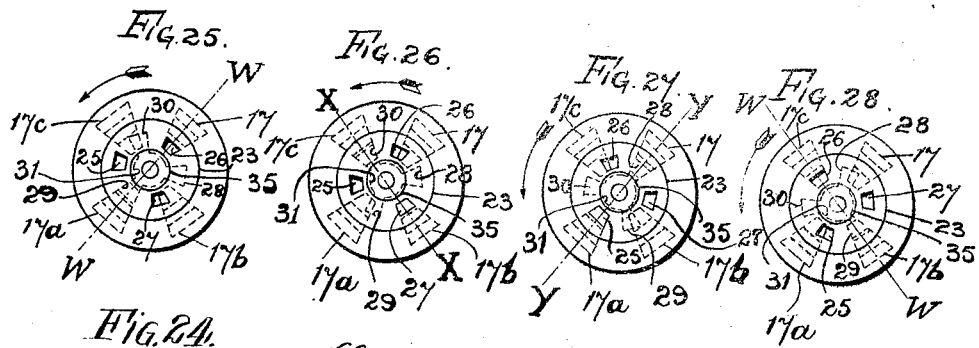
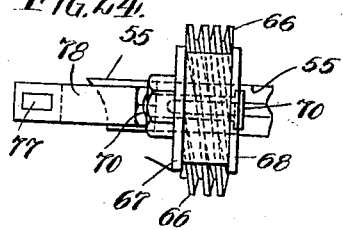

July 8, 1924.
J. E. SCHUMACHER
1,500,206
STEAM, HYDRAULIC, AND OTHER FLUID PRESSURE ENGINE
Filed July 9, 1923   9 Sheets-Sheet 7
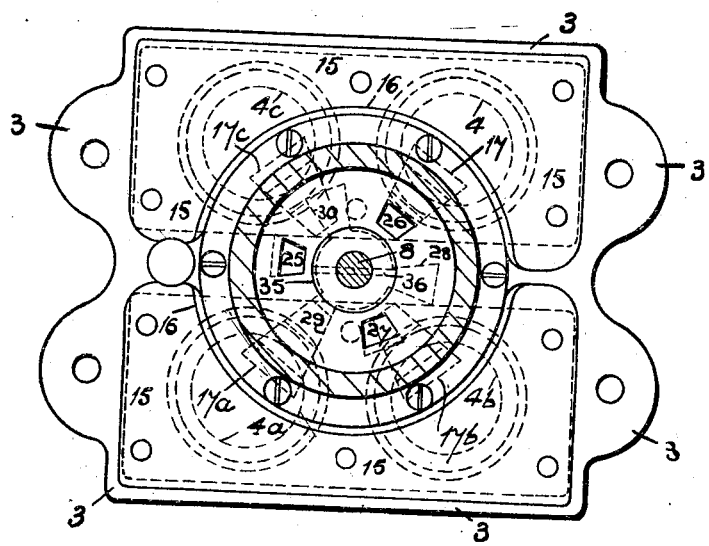
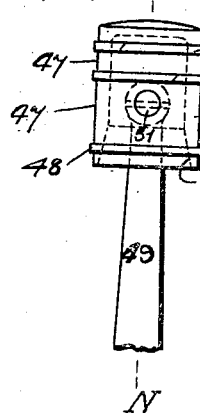
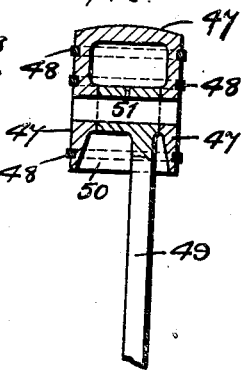
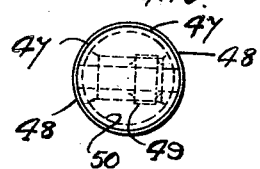

July 8, 1924.

J. E. SCHUMACHER 1,500,206

STEAM, HYDRAULIC, AND OTHER FLUID PRESSURE ENGINE

Filed July 9, 1923

Inventor
James E. Schumacher,
By Cushman, Bryant & Darby
Attys

Patented July 8, 1924.

1,500,206

UNITED STATES PATENT OFFICE.

JAMES EDWARD SCHUMACHER, OF YORK, ENGLAND.

STEAM, HYDRAULIC, AND OTHER FLUID-PRESSURE ENGINE.

Application filed July 9, 1923. Serial No. 650,422.

*To all whom it may concern:*

Be it known that I, JAMES EDWARD SCHUMACHER, a citizen of the Republic of Germany, residing at 50 Clarence Street, in the city and county of York, England, have invented new and useful Improvements in or Relating to Steam, Hydraulic, and Other Fluid-Pressure Engines.

This invention has reference to improvements in engines operated by steam, water, gas, compressed air or other fluid or liquids under compression, all of which liquids or fluids are hereinafter termed the " operative fluid," and it particularly relates to engines of the type having a rotating valve for admitting the operative fluid directly to the cylinders or to annular grooves of the valve casing and from thence to ports of a single or double acting cylinder or cylinders.

The object of this invention is to provide an engine in which the operative fluid is either admitted directly into the interior of a single acting engine, or, in the case of a double acting engine, into annular grooves of a block fixed within the valve casing and upon the top of which the valve is arranged to rotate, and in the case of a single acting engine, the reversing gear is arranged at the base, and for a double acting engine it is preferably at the top.

In this invention an improved reversing gear and also means for automatically balancing the rotary valve will be described.

This invention will be described as applied to the vertical type of engine, but it should be clearly understood that the invention with slight modifications could be applied to the horizontal type.

In the drawings hereunto annexed:—

Fig. 1 is a front elevation of a single acting engine with this invention applied thereto;

Fig. 2 is a side elevation of the same looking at the reversing gear end and with the pistons and connecting rods for one set of cylinders removed;

Fig. 3 is a part sectional elevation on the irregular dotted line A, B, Fig. 1;

Fig. 4 is a part plan looking on the top of Fig. 1;

Fig. 6 is a plan of the plate upon which the rotary valve rotates;

Fig. 7 is a part sectional elevation on the irregular dotted line E, F, Fig. 4;

Fig. 8 is a part section plan on line G, H, Fig. 7;

Fig. 9 is a section on line I, J, Fig. 11;

Fig. 10 is an elevation drawn at a right angle to Fig. 9;

Fig. 11 is a plan looking on the top of Fig. 9;

Fig. 12 is a section on line K, L, Fig. 11;

Fig. 13 is an elevation of the piston and its connecting rod;

Fig. 14 is a part sectional elevation on line M, N, Fig. 13;

Fig. 15 is a plan looking on the top of Fig. 13;

Fig. 24 is a plan of Fig. 23;

Figs. 25, 26, 27 and 28 are diagrammatic plans drawn on a reduced scale of the position of the rotating valve for a single acting engine provided with four cylinders;

Fig. 31 is a plan of the valve seat for the double acting engine.

Like parts in all the views are marked with similar letters of reference.

Figure 5:
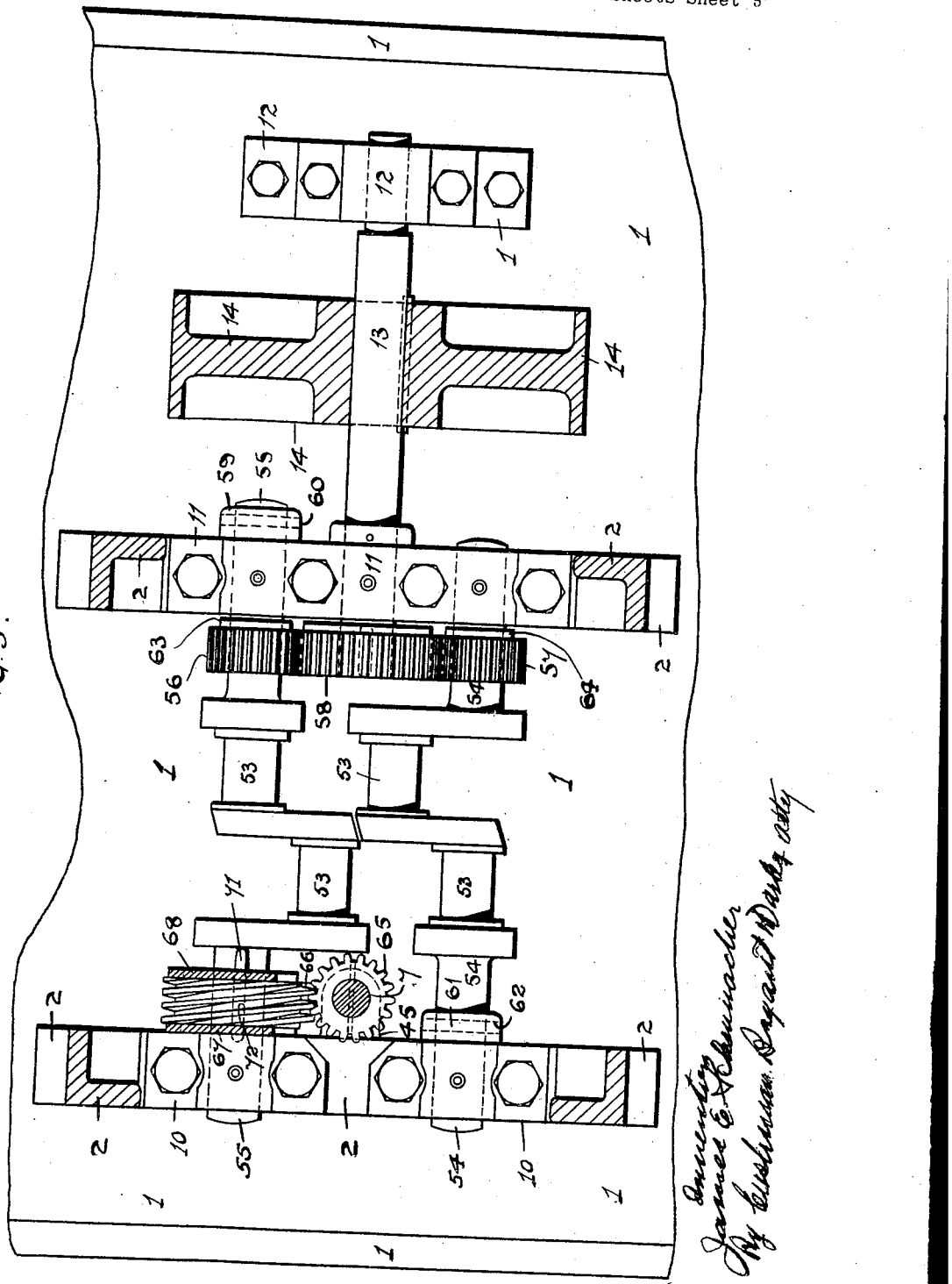
Fig. 5 is a sectional plan on line C, D, Fig. 2.
Figure 16:
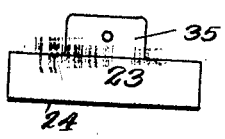
Fig. 16 is an elevation of the rotary valve.
Figure 18:
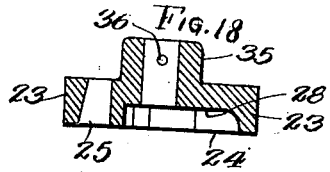
Fig. 18 is a section on line O, P, Fig. 17.

On a suitable bedplate 1 are mounted and fixed a pair of standards 2 at suitable distances apart having secured to their top a plate 3 to which the four cylinders 4, 4$^a$, 4$^b$, 4$^c$ shown at Figs. 1 to 4 are secured. In some cases it may be found advisable to use only two cylinders.

On the upper surface of the plate 3 are mounted and fixed the brackets 5, 5, the tops of which are secured together by the crosspiece 6 in which are formed the bearings for the vertical spindle 7 and for the pin or stud 8 upon which the rotary valve 9 is mounted.

At the bottom of the standards or uprights 2, 2 are formed or fixed bearings or pedestals 10, 10 and one long pedestal 11 provided with bearings for three separate shafts.

At Fig. 5 two separate pedestals 10 are shown, but if necessary these may also be formed in one having bearings for two shafts, but it is preferred to use two separate bearings in order that provision may be made for the clearance of the hereinafter described worm wheel.

On the bedplate is also mounted a third pedestal 12 for receiving the reduced end of a shaft 13 upon which shaft is mounted a fly wheel 14. The opposite end of the shaft 13 is carried by the central bearing of pedestal 11.

The cylinders 4, to 4ᶜ are fixed in some cases on the top of the plate 3, or, as shown in the drawings at Fig. 1, they are pendantly secured to its undersurface, and the said plate is also recessed at 15 for lightness and provided with a valve seating 16, as shown in section at Fig. 3.

By the employment of the valve seating 16 provision is made for it being readily faced up to form the valve seating. To the top of the valve seating is fixed the valve casing 9 (Figs. 1 to 4, 7, 20 and 21). At Fig. 7 the plate 3 is shown perforated with one of a number of holes 17 for conveying the operative fluid, which has entered the casing 9 by means of inlet pipe 18, into one of the cylinders 4 to 4ᶜ. A hole is provided for each cylinder employed which in the diagrammatic views at 25 to 28 are marked respectively 17, 17ᵃ, 17ᵇ, 17ᶜ, from which it will be seen that 17 and 17ᵃ are opposite to each other, and in order that they may be readily understood each position of the rotary valve in Figs. 25 to 28 are represented by dotted lines marked respectively W, W, X, X, and Y, Y, and W, W again, there being four holes in the plate 3 and three inlet holes or ports in the rotary valve.

Figure 20:
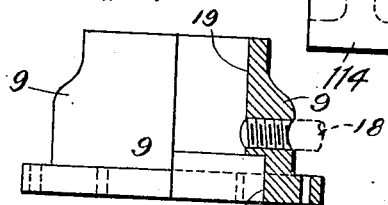
Fig. 20 is a part sectional elevation of the casing for the rotary valve and bearing for the balance piston.

The cover 9 for the single acting engine is fixed directly to the plate 3, as shown at Figs. 1, 2 and 7, and it is provided with a central opening 19,—Fig. 20,—for the reception of the balance piston 20 provided with the circular recess 21 for lightening purposes.

The lower portion of the casing is provided with the enlarged recess 22 which is of such a diameter that the portion 23 of the rotating valve will rotate freely therein and at the same time be a perfect fit.

Figure 19:
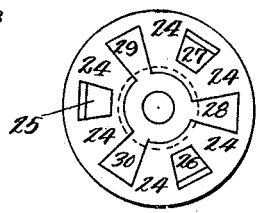
Fig. 19 is a plan looking at the underside of Fig. 18.
Figure 17:
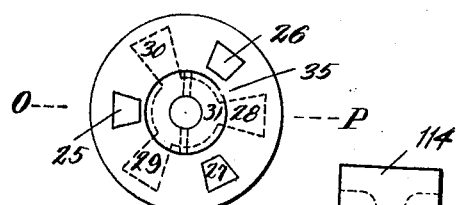
Fig. 17 is a plan looking at the top of Fig. 16.

The face 24 of the rotating valve is arranged to work upon the valve seating 16 and it is provided with three perforations marked 25, 26 and 27,—which may or may not taper towards the upper surface of the valve,—and also with three recesses 28, 29 and 30, which are shaped as shown at Fig. 19; that is to say, they taper inwards towards the circular recess 31. The recesses 28 to 30 are employed for conducting away the exhaust fluid after it has performed the operations, and as it leaves the circular recess 31 it is conducted away into the open air by means of the pipe 32, (Figs. 1 and 2).

It will be understood that the number of inlet and exhaust passages will depend upon the number of cylinders, but the number of exhaust passages will always be the same as the number of inlet passages.

The rotary valve 23 is mounted upon the central bolt, or stud, or spindle 8, which is provided with a head 33 and arranged to pass through the central portion 34 of the balance piston 20.

On the top of the rotary valve is arranged a boss 35 by which it is secured to the central spindle 8 by a pin 36. On the central spindle is mounted slidably on a key or spline a spur wheel 37 capable of sliding in an up-and-down direction upon the central spindle 8, and the said wheel is employed for imparting a rotary motion to the central spindle 8 and valve 23. Between the undersurface of the spur wheel 37 is mounted any suitable arrangement of anti-frictional bearings, as, for example, the ball race 38 is provided with the balls 39 which are interposed between the upper surface of the balance piston 20 and the undersurface of the spur wheel 37.

A nut 40 is arranged to work on the screw threaded portion 41 of the upper portion of the bolt or spindle 8 for checking the movement of the balance piston 20. The outer end of the bolt or spindle 8 is also reduced in diameter for forming a pin engaging with a bearing formed in the cross-bar 6, as shown at Fig. 1.

A spur wheel 42 is made to engage with the spur wheel 37 and spur wheel 42 is mounted upon the upper end of the shaft 7 which is reduced at its upper end 43 and its lower end 44 for entering the bearings formed for their reception respectively in the cross-bar 6 and into the lug 45 formed on, or fixed to, one of the standards 2, the lower end of the latter being retained in position by the bolts or cross-bars 46.

The spur wheels, as shown in the drawings, give a ratio of two revolutions of the wheel 37 and parts connected thereto to one revolution of the wheel 42 and the shaft 7.

The piston 20 by the action of which the valve 23 is balanced is, as previously described, fitted about the spindle 8, so that it may move longitudinally thereof, but is not connected to the spindle to rotate with it and the valve. The pressure within the casing 9 acts upon the lower face of the piston to raise the same until the spur wheel 37 is in contact with the nut 40, and this upward pressure acts to balance the direct pressure of the operation fluid on the exposed upper face of the valve 23. When the pressure decreases, then the balance piston 20 will fall on to the boss 35 of the rotary valve 23. By this means the rotary valve is permitted, regardless of the pressure in the casing, to rotate freely with little friction owing to the pressure within the casing 9 acting upon the upper surface of the valve and with a slightly decreased force on the lower surface of the balance piston,—owing to the smaller area of the latter,—the pressure upon the rotary valve tending to hold it upon its seating, and the pressure on the undersurface of the balance piston being to lift the valve away from its seating. The pressure on the lower surface of the balance piston being slightly less than that on the upper surface of the rotary valve, the said valve is therefore not lifted from its seat, but almost all the friction is transferred to the ball race.

As the operative fluid enters the casing 9 it passes through one of the openings 25, 26 or 27,—26 being shown in the drawings,—and passes down the passage 17 in the plate 3 and enters one of the cylinders 4 to 4ᶜ, when it acts upon the piston 47 provided with the piston rings 48, and presses the piston down to its lowest position and by means of the connecting rod 49 the upper end of which passes into the recess 50 and is connected to the piston 47 by means of a gudgeon pin 51. the lower end 52 of the connecting rod 49 is attached to one of the cranks 53. At Fig. 5 four of such cranks are shown so as to provide for a group of four cylinders and four pistons and their respective connecting rods, cranks 53 being arranged at right angles to each other. Two shafts 54, 55 are each provided with two cranks 53 and they are mounted respectively in the pedestals 10, 10 and 11. The two crank shafts are geared together by means of the spur pinions 56, 57,—respectively provided with bosses 63, 64,— arranged to gear with the spur wheel 58 mounted and fixed upon the driving shaft 13. The two pinions 56 and 57 are of the same diameter and provided with the same number of teeth so as to make the same number of rotations to one of the spur wheels 58. The crank shaft 55 is retained in its working position by means of the boss 63 and collar 59 and pin 60 mounted upon its right hand end, as shown at Fig. 5, and the crank shaft 54 is retained in its working position by means of the boss 64 and the collar 61 and pin 62 mounted on its left hand end.

On the shaft 7 is mounted and fixed a worm wheel 65 which gears with a worm 66 mounted upon, and arranged to slide on, a portion of the shaft 55 between the side of the standard 2 and one of the cranks 53. On each side of the worm is fixed a plate 67, 68 which are held apart by a block 69 secured in position by a bolt 70, Figs. 22 to 24. Between the inner surfaces of the plates 67 and 68 and working in a keyway 71 formed in the crank shaft 55 is a key 72 for causing the worm 66 to rotate with the shaft as well as being slidable thereon.

Figure 22:
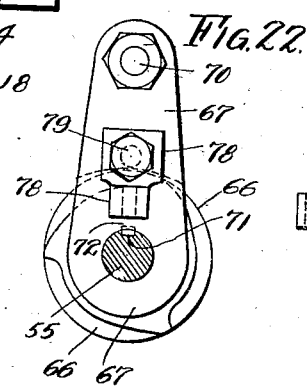
Fig. 22 is an end elevation of the carrier for the worm of the reversing mechanism.
Figure 23:
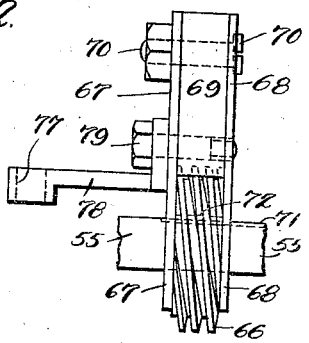
Fig. 23 is a front elevation of the same.
Figure 21:
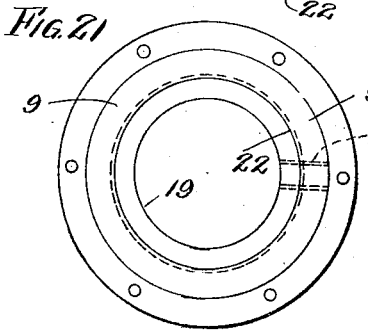
Fig. 21 is a plan looking at the top of Fig. 20.

The requisite intermittent reciprocating motion is imparted to the worm and the plates by the handled lever 73 which is pivoted at 74 to a bracket 75, and the lower end of the said lever is made cylindrical at 76 so as to fit within the rectangular or other shaped hole 77,—Figs. 22 to 24, formed for its reception in the bracket 78 which is fixed by the set screw 79 to the plates 67, 68 and block 69.

To the handled portion 80 of the lever 73 is jointed at 81 a spring controlled handle 82 provided with a bifurcated projection 83 for connecting it by means of a link 84 to the lugs 85 of a sliding plate 86. The sliding plate 86 is provided with a projection or catch 87 which engages with one of two or more notches 88 formed in the arm or bracket 89 which is fixed by the flanges 90 and set screws 91 to the edge of one of the standards 2. In the position shown at Figs. 1 and 2 the lever 73 and its catch 89 is shown engaged with an inner notch 88.

The operation of the above described engine is as follows:—

The operative fluid enters the valve casing 9 through the inlet pipe 18 and extends in all directions and passes down through one of the inlet ports into one of the cylinders 4 to 4ᶜ. The position of the valve 23 determines which of the cylinders is in action, as, for instance, when the inlet opening 26 of the rotary valve 23 is over the opening or passage 17 in the plate 3 the opposite exhaust recess 29 is over the passage 17ᵃ which communicates with cylinder 4ᵃ. The opening 26 and exhaust recess 29 are then on the dotted line W, W (Fig. 25). As the valve rotates in the direction shown by the arrow the inlet opening 27 is brought over the passage 17ᵇ which communicates with cylinder 4ᵇ and simultaneously the exhaust recess 30 will be brought over passage 17ᶜ which communicates with cylinder 4ᶜ and the opening 27 and exhaust recess 30 are then opposite to each other and on the dotted line X, X (Fig. 26). As the rotary valve continues to rotate its opening 25 will be moved over the passage 17ᵃ which communicates with cylinder 4ᵃ and the exhaust recess 28 will then be over passage 17 which communicates with cylinder 4, and the said inlet opening and exhaust recess will then be on the line Y, Y, (Fig. 27). On further rotation of the valve the opening 26 will be over the passage 17ᶜ which communicates with cylinder 4ᶜ and the exhaust recess 29 will then be over passage 17ᵇ which communicates with cylinder 4ᵇ and the said inlet opening and exhaust recess will then be on the lines W, W (Fig. 28). The rotation of bringing the inlet openings and exhaust recesses over their respective passages is then repeated so long as the operative fluid is admitted to the casing 9.

The operative fluid during its expansion lifts the balance piston 20 until the same is checked by the nut 40 on the top of the valve spindle or bolt 8. When, as the area of the balance piston 20 is less than the area of the valve 23 it gives the valve just as much pull as is required to nearly balance the valve, consequently the valve rotates with a minimum of friction and the principle load is carried by the ball or other anti-frictional bearing which is placed, as previously described, between the balance piston 20 and the spur wheel 37 above it. The valve is actuated by the wheel 37 keyed on to the spindle or bolt 8 and they rotate, whereas the balance piston 20 is arranged to only move either up or down as may be required.

By the worm 66 being engaged with the worm wheel 65 mounted upon the vertical shaft 7 the required rotary motion is imparted to the spur wheel 42 whereby the required rotary motion is transmitted to the spur wheel 37 for operating the spindle 8 and rotary valve 23. The worm on the crank shaft 55 may be arranged to rotate, say, six times to one rotation of the worm wheel 65 and spur wheel 42 has preferably double the number of teeth to that of the wheel 37 which gives the rotation of three revolutions of the crank shaft to one of the valve spindle.

When the engine is stationary, or working under any pressure or at any speed it can be reversed by moving the handled lever 73, and its catch 86 is operated by the spring controlled lever 82 and moved into the outer notch 88 in bracket 89. The lower end 76 of lever 73 will then move the bracket 78 inwards carrying with it the plates 67 and 68 and block 69 and the worm 66 and key 72. The sliding movement of the worm slightly turns the worm wheel 65 in an opposite direction and in so doing it gives a rotary movement to the valves 23 thereby momentarily stopping the entry of the operative fluid to the particular cylinder then open and changing the inlet from that passage to that of another cylinder, thereby reversing the motion of the engine.

Figure 30:
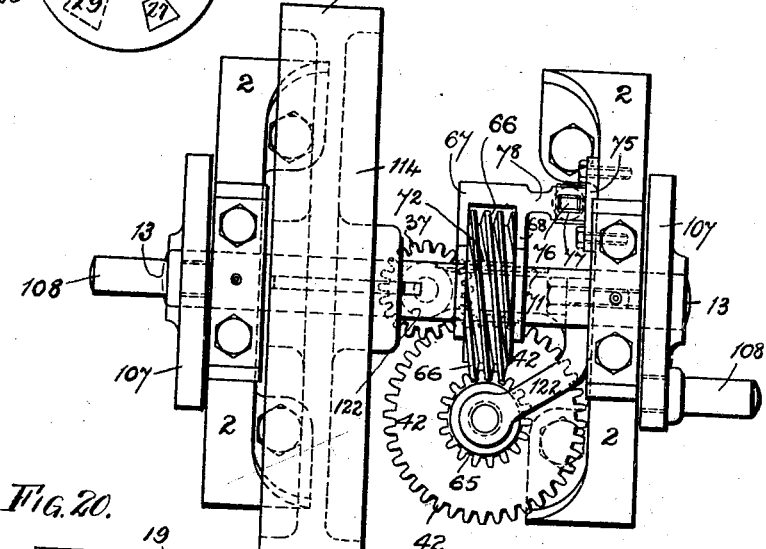
Fig. 30 is a plan of the reversing gear for the engine shown at Fig. 29.
Figure 29:
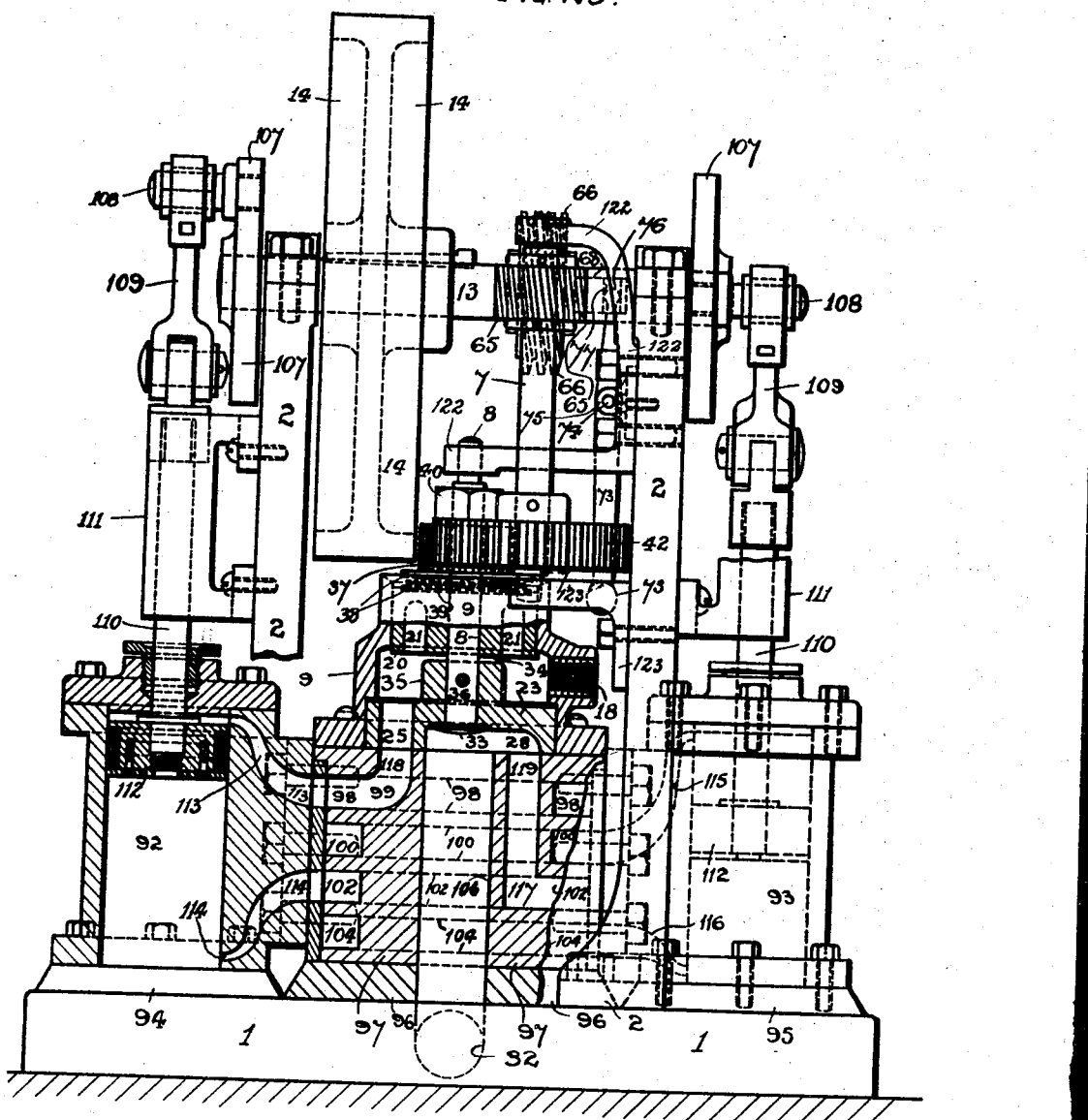
Fig. 29 is a part sectional elevation of the invention applied to a double acting engine.

At Figs. 29 to 31 is shown a double acting engine with a pair of cylinders 92 and 93 fixed to projections 94 95 on the bedplate 1, and a third projection 96 is provided for the block 97 in which are formed a number, say, four, of circumferential grooves marked 98, 100, 102, 104 and with a central opening 106 which communicates with the exhaust pipe 32. Owing to the engine cylinders being arranged on the bedplate instead of pendantly fixed to the plate 3 on the top of the standards, it requires that the driving shaft 13 should be mounted on the top of the standards 2 in suitable bearings and on each end of the driving shaft 13 and on the outside of the standards 2, 2 is mounted a weighted or other disc 107 provided with a pin 108 to which is connected the bifurcated rod 109 which is jointed to the end of the piston rod 110 which works through a guide 111 of any suitable construction fixed to a standard 2. In this case a piston 112 which is secured to the lower end of each piston rod 110 is of any ordinary and suitable construction. The two cylinders are provided with passages 113, 114, 115 and 116; that is to say, two passages for each cylinder whereby the operative fluid is brought into each cylinder alternately at each of its ends. The passages 113 to 116 respectively communicate with the passages in the cylinder and the circular grooves in the block 97 as follows:—

Passages 113 and 114 in cylinder 92 communicate respectively with passages 98 and 102, and passages 115 and 116 of cylinder 93 respectively with passages 100 and 104. Horizontal communications are made at predetermined points in the block 97 which communicate with the circumferential grooves 98, 100, 102 and 104 respectively. That is to say, three vertical passages 118 communicate with the circumferential groove 98 by means of three passages 99,— one of which is shown in the drawings,— and three vertical passages 119 communicate with circumferential groove 102 by means of three passages 117. Circumferential grooves 100 and 104 are connected to the three vertical inlet passages 120 by similar passages to the passage 117, but these last named passages are not shown in the drawings. The exhaust operative fluid passes from the cylinder 92 through the passage 114 to and along the circumferential groove 102 and thence to passage 119 by means of the connection 117 and through the exhaust recess 28 of the rotary valve to the exhaust outlet 106. Inlet passages marked 118 (Fig. 29) permit of the operative fluid passing through the inlet opening 25 in the valve 23 into a passage which communicates with the circular passage 98, and there are two other openings at points, at, say one hundred and twenty degrees apart similar to the passage 117 for permitting the operative fluid to pass through the three inlet openings in the rotary valve to the cylinder. When the exhaust recesses of the rotary valve come over the vertical passages in the block (arranged around the same as shown at Fig. 31) the said vertical passages are then used for exhaust purposes. In the position of the piston 112 shown in cylinder 92 passage 114 is arranged to communicate with the circular groove 102 and the exhaust fluid travels round that groove until it reaches the openings 117, and then it can pass up the three passages 119,—only one being shown in the drawings,—to the top of the block when the exhaust recesses 28, 29 and 30 of the rotary valve will be over the passages 119, that is, one exhaust recess will be over one vertical passage 119 and permit of the exhaust fluid passing therefrom and down the vertical passage 106 to the exhaust tube 32. Corresponding passages 120 and 121,—which are only shown in the plan view (Fig. 31),—are also employed and they will vary in length to correspond with the grooves 100 and 104 respectively for admitting in the first instance the operative fluid into passage 100 and for the exhaust to enter the circular groove 104 and to pass through openings in the block to vertical passages 120.

It will readily be understood that three inlet openings in the valve communicate with each circular groove at one time, and at the same time three exhaust ports are open. That is to say, three inlet ports marked at Fig. 31 as 118 are opened simultaneously, and three exhaust ports 119 are also opened, and the other ports are then wholly closed by the solid portions of the valve between the exhaust and the inlet portions.

Owing to the cylinders being arranged on the bedplate instead of at a distance above and therefrom, the casing 9, rotary valve 23, spur gearing 42 and 37, antifrictional race 38 and balls 39, balance piston 20, worm 66 and worm wheel 65, reversing level 73 and parts connected therewith and the fly wheel or driving pulley 14 are all arranged above the cylinders and are of a similar construction to those described for the single acting engine except that the vertical shaft 7 is shortened to adapt it to the new positions of the cylinders and that bracket 122 takes the place of the crosspiece 6, and bracket 123 also takes the place of lug 45. The bracket 122 is arranged so as to support the spindle or bolt 8 and shaft 7.

The reversing of the engine is accomplished as previously described.

On steam being admitted to a cylinder through the inlet ports, motion will be transmitted from the piston to the crank shaft, thence through the worm to the vertical shaft, and on the valve spindle for communicating the necessary rotary motion to the valve for the admission of steam to one cylinder whilst the exhaust steam is being conveyed away from a second cylinder of each group.

What I claim is:—

1. Mechanism for controlling the admission and exhaust of a fluid pressure engine comprising a casing, a rotary valve in said casing having a stem extending outward through the casing and provided with an abutment, a piston loosely mounted on the valve stem between the valve and the abutment, means for introducing operative fluid into the casing to act on the opposed faces of the piston and valve, and means for rotating the valve.

2. Mechanism for controlling the admission and exhaust of a fluid pressure engine comprising a casing having inner and outer chambers of different areas, the inner chamber being larger than the outer, a rotary valve in the inner chamber of the casing and having a stem extending through said outer chamber, a piston fitted on the valve stem within the outer chamber of the casing and free to move longitudinally thereon, an abutment on the piston stem for limiting movement of the piston away from the valve, means for introducing operative fluid into the casing to act on the opposed faces of the piston and valve, and means for rotating the valve independent of the piston.

JAMES EDWARD SCHUMACHER.

Witnesses:
H. FAIRBURN-HART,
ALICE N. TURNER.